US006724748B1

(12) United States Patent
Stille et al.

(10) Patent No.: US 6,724,748 B1
(45) Date of Patent: Apr. 20, 2004

(54) INTELLIGENT NETWORK AND PACKET DATA NETWORK INTEROPERABILITY

(75) Inventors: Mats Stille, Stockholm (SE); Anna Nyberg, Lindlingö (SE); Paul Martlew, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/282,832

(22) Filed: Mar. 31, 1999

Related U.S. Application Data

(60) Provisional application No. 60/086,280, filed on May 21, 1998.

(51) Int. Cl.⁷ .............................................. H04L 12/66
(52) U.S. Cl. ........................................................ 370/352
(58) Field of Search ................................. 370/271, 321, 370/352, 353, 354, 355, 356, 401, 442, 433, 498; 455/405, 406, 407, 408, 422, 432, 433, 435, 461

(56) References Cited

U.S. PATENT DOCUMENTS

| 4,408,323 | A | | 10/1983 | Montgomery | 370/60 |
|---|---|---|---|---|---|
| 4,723,238 | A | | 2/1988 | Isreal et al. | 370/60 |
| 4,933,931 | A | | 6/1990 | Kokubo | 370/60 |
| 5,481,534 | A | | 1/1996 | Beachy et al. | 370/60 |
| H1641 | H | | 4/1997 | Sharman | 379/60 |
| 5,751,707 | A | | 5/1998 | Voit et al. | 370/60 |
| 6,061,346 | A | * | 5/2000 | Nordman | 370/352 |
| 6,188,752 | B1 | * | 2/2001 | Lesley | 379/114.16 |
| 6,208,628 | B1 | * | 3/2001 | Monrad et al. | 370/328 |
| 6,223,035 | B1 | * | 4/2001 | Pierce et al. | 455/433 |
| 6,226,364 | B1 | * | 5/2001 | O'Neil | 379/114.2 |
| 6,307,867 | B1 | * | 10/2001 | Roobol et al. | 370/470 |
| 6,415,151 | B1 | * | 7/2002 | Kreppel | 455/445 |
| 6,442,159 | B2 | * | 8/2002 | Josse et al. | 370/354 |
| 6,463,275 | B1 | * | 10/2002 | Deakin | 455/406 |
| 6,490,271 | B1 | * | 12/2002 | Erjanne | 370/347 |

FOREIGN PATENT DOCUMENTS

| GB | 2371448 A | * | 7/2002 | H04M/17/00 |
|---|---|---|---|---|
| WO | WO 95/26114 | | 9/1995 | |
| WO | WO 97/26739 | | 7/1997 | |
| WO | WO 9726764 | * | 7/1997 | |
| WO | 99/00875 | | 10/1999 | |
| WO | WO 02067600 A1 | * | 8/2002 | |

OTHER PUBLICATIONS

*An Introduction to GSM Enhancements for Operator Specific Services (CAMEL)*; by D.G. Smith; IEEE Colloquium on Mobile Communications Towards the Next Millenium and Beyond; May 17, 1996 pp. 6/1–6/09; XP000605991.

* cited by examiner

Primary Examiner—Chi Pham
Assistant Examiner—Keith M. George

(57) ABSTRACT

A method and system are disclosed for creating an interface between a packet-switched network and an IN, which is based on an interface between an associated circuit-switched network and an IN/CAMEL service. Meanwhile, the CAMEL application can also provide IN services to mobile subscribers while they are roaming in other networks (e.g., international roaming).

15 Claims, 2 Drawing Sheets

A (during packet activation or communication phase)

B (during packet communication phase)

C (during packet communication phase)

US 6,724,748 B1

INTELLIGENT NETWORK AND PACKET DATA NETWORK INTEROPERABILITY

CROSS-REFERENCES TO RELATED APPLICATIONS

This Application for Patent claims the benefit of priority from, and hereby incorporates by reference the entire disclosure of, co-pending U.S. Provisional Application for Patent Ser. No. 60/086,280, filed May 21, 1998.

BACKGROUND OF THE INVENTION

1. Technical Field of the Invention

The present invention relates in general to the telephony field and, in particular, to a method and system for attaining interoperability between an Intelligent Network (IN) and Packet Data Network (PDN).

2. Description of Related Art

Packet-switched communications standards have been specified for digital cellular telecommunications systems in both Europe and Japan. For example, standards for the General Packet Radio Service (GPRS) have been specified for the Pan-European Global System for Mobile Communications (GSM) by the European Telecommunications Standards Institute (ETSI), the Packet Personal Digital Cellular (PPDC) System by the Nippon Telephone and Telegraph Company (NTTC) in Japan, and packet-switched standards are being specified for the International Mobile Telecommunications-2000 (IMT-2000) System. These packet-switched communications systems being developed are considered more efficient than conventional circuit-switched communications systems in transferring information such as audio, video and data in a mobile radiotelephone system environment. Albeit, the efficiency is likely higher for circuit-switched voice, but the efficiency is higher for packets than the same coding used for circuit-switched data. However, it is assumed that in the initial operational years, the packet-switched communications systems will be used primarily for accessing and transferring Intranet (e.g., companies' local networks) and Internet (e.g., World-Wide Web or WWW) data, while the conventional circuit-switched systems will still provide the traditional bearer services (e.g., voice calls).

For some time now, mobile communications network operators (e.g., GSM, PDC and IMT-2000 network operators) have been providing certain value-added services such as, for example, the new IN/Customized Applications for Mobile network Enhanced Logic (CAMEL) service. CAMEL is a feature in the GSM Standard that integrates support of operator-specific IN services into the GSM architecture. Essentially, the CAMEL services are overlaid on top of the GSM circuit-switched traffic (e.g., voice calls). However, a problem that exists is that there is currently no known capability for overlaying these value-added services on packet-switched traffic. The main reason for this problem is that this capability is expected to be provided by the Intranet operator or Internet Service Provider (ISP), and not as part of the value-added service (e.g., IN/CAMEL) itself.

Currently, no international standard is being promulgated for an interface between an IN and packet-switched network, and as mentioned earlier, there is no known solution for the problem of how to provide value-added services (e.g., CAMEL) for packet-switched communications. As such, this is an immediate problem for mobile communications network operators who are currently providing IN services, such as, for example, the popular pre-paid services being offered for mobile subscribers' circuit-switched calls (e.g., voice calls and G3 facsimile calls). Such pre-paid IN services monitor the elapsed time of the circuit-switched call for a mobile subscriber, and translate that time into charges that are billed to the subscriber in proportion to the communications time used. However, there is currently no method or system available that enables a pre-paid IN service application to monitor the elapsed communications time for a subscriber using packet-switched communications.

Consequently, a pressing need has arisen for a PDN/IN interface and interoperability which will enable such services as IN/CAMEL to be overlaid on top of packet-switched traffic as a complement to conventional Intranet and Internet value-added services. As described in detail below, the present invention successfully meets this need and resolves these and other related problems.

SUMMARY OF THE INVENTION

In accordance with a preferred embodiment of the present invention, a method and system are provided for creating an interface between a packet-switched network and an IN, which is based on an interface between an associated circuit-switched network and an IN/CAMEL service. Meanwhile, the CAMEL application can also provide IN services to mobile subscribers while they are roaming in other networks (e.g., international roaming).

An important technical advantage of the present invention is that mobile network operators providing IN/CAMEL services to offer a pre-paid subscription to mobile users, which will cover traditional voice calls and also Intranet and Internet usage through a packet-switched communications standard.

Another important technical advantage of the present invention is that a mobile user of circuit-switched and packet-switched communications can subscribe with one network operator to provide a pre-paid service and pay in advance only once for the subscription. The network will subtract payments from the user's account for both the circuit-switched and packet-switched traffic.

Still another important technical advantage of the present invention is that a viable interface and interoperability are provided between a packet data node and an IN/CAMEL node, which can be used to overlay CAMEL services on packet communications as a service complement to Intranet and Internet value-added services.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
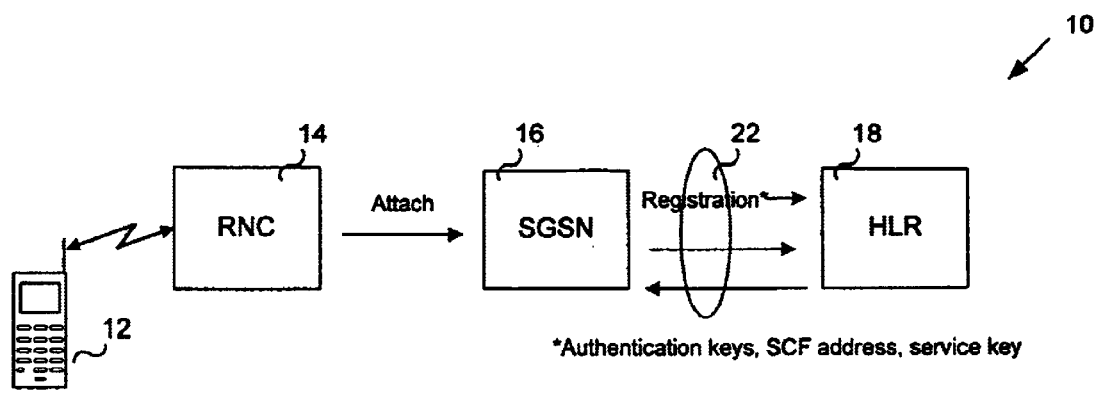
FIG. 1 is a block diagram of a system that can be used for connecting an IN/CAMEL service with a mobile packet data communications session, in accordance with a preferred embodiment of the present invention.
Figure 2A:
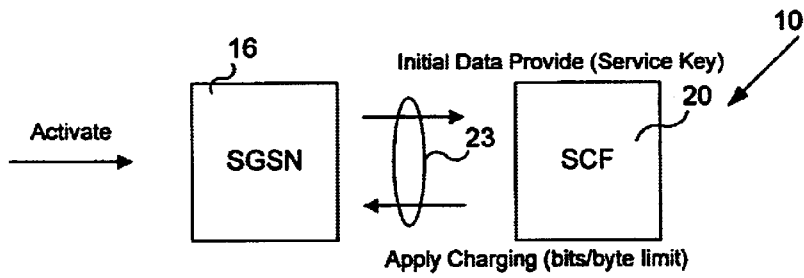
FIGS. 2A and 2B are related block diagrams that show additional parts of the system shown in FIG. 1.
Figure 2B:
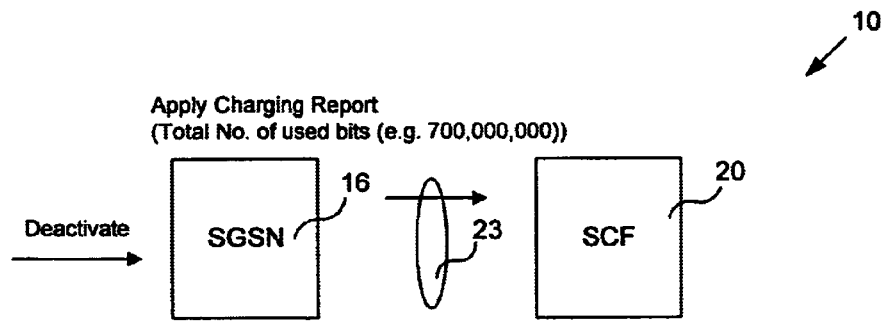
Figure 3:
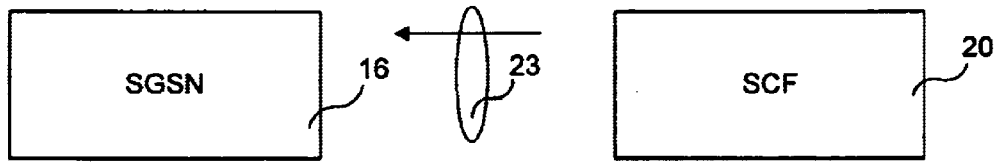
FIG. 3 is a block diagram of the system shown in FIGS. 1 and 2 in an exemplary scenario where the end-user is communicating via parallel connections, such as a circuit-switched connection and a packet-switched connection.
Figure 3:
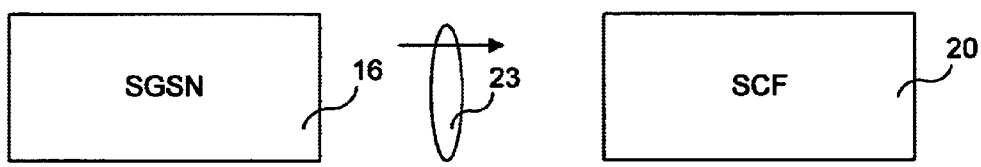
Figure 3:
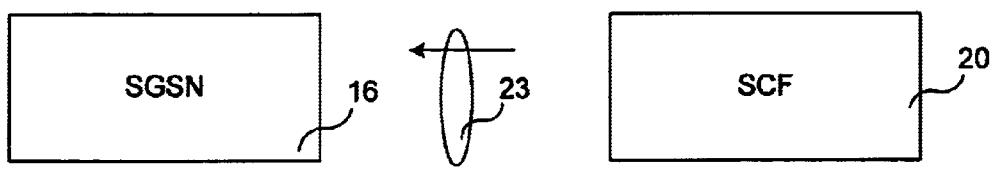

The preferred embodiment of the present invention and its advantages are best understood by referring to FIGS. 1–3 of the drawings, like numerals being used for like and corresponding parts of the various drawings.

Essentially, in accordance with a preferred embodiment of the present invention, a method and system are provided for creating an interface between a packet-switched network and an IN which is based on an interface between an associated circuit-switched network and an IN/CAMEL service. Meanwhile, the CAMEL application can also provide IN services to mobile subscribers while they are roaming in other networks (e.g., international roaming).

Specifically, FIG. 1 is a block diagram of a system that can be used for connecting an IN/CAMEL service with a mobile packet data communications session, in accordance with a preferred embodiment of the present invention. As shown, a mobile phone 12 can register or initially attach (connect) to a packet network via a radio network control (RNC) 14. The receiving packet data communications node (e.g., referred to as a Serving GPRS Support Node or SGSN) 16 in the serving network interrogates the end-user's Home Location Register (HLR) 18 for certain subscription and security information that the HLR is expected to return. In response, the HLR 18 provides this information (e.g., authentication keys, etc.) to the SGSN 16. For this embodiment, this information from the HLR can also include a Service Key with the address of an IN/CAMEL service application in an IN Service Control Function (SCF) involved (described in more detail below), which enables the CAMEL service to enter the packet communications session. In accordance with the GSM Technical Specification for CAMEL Stage 2:GSM TS 03.78 (version 6.1.1 Release 1997), the Service Key can identify to the IN SCF the CAMEL service logic that should be applied. It is useful to note that in the future, an ISP may assume some or all of the functions of an HLR. However, substituting an ISP for the HLR in the future should have no appreciable effect on the scope of the present invention. As such, the interface 22 between the SGSN 16 and the HLR 18 can be, for example, a Signalling System 7 (SS7) interface or an interface based on an Internet Protocol (IP). For example, the information can be conveyed over the SS7 interface in a message using a Mobile Application Part (MAP) protocol or an INAP protocol.

Referring to the block diagram shown in FIG. 2A, the exemplary system 10 also includes the IN/CAMEL network's SCF 20, which can be used to implement the present invention. For example, in accordance with the CAMEL specification, a GSM (IN/CAMEL) SCF is a functional entity that contains the CAMEL service logic used to implement an Operator-Specific Service (OSS). Also, in accordance with the CAMEL specification, the (IN/CAMEL) SCF can interface with an HLR (18), a GSM Service Switching Function (SSF), and a GSM Specialized Resource Function (SRF) using a MAP or CAMEL AP (CAP) protocol.

When a mobile phone (12) activates a packet data communications session (e.g., immediately or sometime after the registration or attachment phase), the SGSN 16 sends a CAMEL-related signal to the IN/CAMEL SCF 20. As such, the SGSN 16 had earlier determined the identity of the IN/CAMEL network during the initial registration or attachment phase described above. The CAMEL-related signal received at the SCF 20 notifies the IN/CAMEL network that a packet data session is about to be set up before the packet data connection phase is continued further. The main reason for this notification is to conserve connection capacity, for example, in the event that the subscriber's pre-paid service does not allow for additional packet data communications.

Referring to the block diagram shown in FIG. 2A, the CAMEL-related signal sent from the SGSN 16 to the SCF 20 can be implemented as part of an existing message (e.g., "InitialDataProvide" or an Initial Detection Point (DP) message) in accordance with the CAMEL protocol, or as a new message. In accordance with the CAMEL specification (Paragraph 9.1.5.2), an Initial DP message contains certain information elements (IEs) including a Service Key. As described earlier, the Service Key can be used to address the correct CAMEL service application(s) within the SCF (20).

In response, the IN/CAMEL SCF 20 can return information to the SGSN 16 in an "ApplyCharging" message. In accordance with the CAMEL specification (Paragraph 9.2.2), an ApplyCharging message is an Information Flow (IF) which is used for interacting from a GSM SCF with GSM SSF charging mechanisms in order to control the duration of a call. As such, the SCF 20 can use an ApplyCharging IF to instruct the SGSN 16 about how it is to function with respect to the end-user and/or SCF 20.

For this embodiment, the SCF 20 sends an ApplyCharging IF to the SGSN 16, which provides information regarding the number of packet data bytes that the end-user can transmit. For example, the SCF 20 can send an ApplyCharging IF to the SGSN 16 with an IE including the value "1024,000,000". This information can be interpreted by the SGSN 16 to mean that the SGSN is to clear the packet connection when 1024 Mbits have been transmitted to/from the end-user from/to the packet data network. For this embodiment, the interface 23 between the SGSN 16 and SCF 20 can be, for example, an SS7 (MAP or CAP) or IP-based interface.

Referring to the block diagram shown in FIG. 2B, in the event that the end-user clears the packet data session (by implicit or explicit deactivation) before the maximum bit limit is exceeded (e.g., 1024 Mbits), the SGSN 16 can send an IN/CAMEL message (e.g., "ApplyChargingReport" IF) to the SCF 20 in conjunction with the packet communications session clearing procedure. In accordance with the CAMEL specification (Paragraph 9.1.2), an ApplyChargingReport IF can be used by a GSM SSF to report to a GSM SCF information that was requested in an ApplyCharging IF. For this embodiment, an ApplyChargingReport IF can be used by the SGSN 16 to let the SCF 20 know how many bits were transmitted during the packet communications session. For example, an IE in the ApplyChargingReport IF can include the value "7,000,000" to represent the number of bits that were transmitted to/from the end-user during a previous packet data session. The SCF 20 can then subtract the previous session's "used" number of bits from the maximum number of bits available for use, in order to determine a new value representing the maximum number of bits that can be used for the next packet session (e.g., 7,000,000 bits subtracted from the previous maximum of 1024,000,000=324,000,000 bits) Alternatively, such an ApplyChargingReport IF can be used by the SGSN 16 to let the SCF 20 know a new maximum number of bits available for transmission.

FIG. 3 is a block diagram of the system 10 in an exemplary scenario where the end-user is communicating via parallel connections, such as, for example, a circuit-switched connection (e.g., voice call) and a packet-switched connection (e.g., simultaneous use of e-mail). In this case, the IN/CAMEL part of the network should instruct the SGSN 16 to report back to the IN/CAMEL part of the network when a specified number of bits have been passed via both connections (e.g., 100,000,000 bits). This instruction is given so that the IN/CAMEL part of the network can, for example, provide the circuit-switched connection with less voice time during a period when more bits are being transmitted over the packet-switched connection. Consequently, this means that the upper limit of bits allowed for use in the packet session will decrease as the circuit-switched session is connected for a longer period of time. As such, during the packet data session, the IN/CAMEL part of the network has to be able to let the SGSN 16 know what the new value representing the maximum number of bits that can be allowed for transmission. For example, if 50,000 bits have been passed over the two connections since the last 100,000,000 bit report, preferably the SGSN 16 subtracts that 50,000 bits from a new upper limit received. Additionally, if needed, the SCF 20 can order (e.g., in an ApplyCharging IF) the SGSN 16 to report (e.g., in an ApplyChargingReport IF) every time that, for example, 100,000 bits have been passed. In sum, as described above, the present invention advantageously provides a viable interface and interoperability between a packet data node (e.g., SGSN) and an IN/CAMEL node (e.g., SCF), which can be used to overlay CAMEL services on packet communications, as a service complement to Intranet and Internet value-added services.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for establishing an interface between an intelligent network and a packet data network, comprising the steps of:
   activating a communications session in said packet data network;
   a node in said packet data network sending a notification signal to a node in said intelligent network, said notification signal identifying said communications session to said intelligent network;
   said node in said intelligent network sending a control signal to said node in said packet data network, said control signal including information to limit a duration of said communications session in said packet data network, said control signal further including a maximum value of packet data for transmission;
      if said duration of said communications session is limited to a value less than said maximum value of packet data for transmission, said node in said packet data network sending a second signal to said node in said intelligent network, said second signal including information associated with said duration; and
   said node in said intelligent network using said duration information to determine a new maximum value of packet data for transmission.

2. The method of claim 1, wherein said node in said packet data network comprises a serving packet node.

3. The method of claim 1, wherein said node in said intelligent network comprises a service control function.

4. The method of claim 1, wherein said notification signal comprises sending initial data to a service.

5. The method of claim 4, wherein said initial data includes a service key.

6. The method of claim 1, wherein said control signal comprises a request from a service to apply prepaid charging limits to a call.

7. The method of claim 1, wherein said packet data network sends bit interval information to said intelligent network when a specified amount of data has been transmitted, said bit interval information used by said intelligent network to determine a new maximum value of packet data for transmission.

8. A system for establishing an interface between an intelligent network and a packet data network, comprising:
   means for activating a communications session in said packet data network;
   a node in said intelligent network; and
   a node in said packet data network, said node in said packet data network including means for sending a notification signal to said node in said intelligent network, said notification signal identifying said communications session to said intelligent network, and said node in said intelligent network including means for sending a control signal to said node in said packet data network, said control signal including information to limit a duration of said communications session in said packet data network and a maximum value of packet data for transmission;
   wherein said node in said packet data network includes means for sending a session clear signal to said node in said intelligent network if said duration of said communications session is limited to a value less than said maximum value of packet data for transmission, said session clear signal including information associated with said duration, and means for using said duration information to determine a new maximum value of packet data for transmission.

9. The system of claim 8, wherein said node in said packet data network comprises a serving packet node.

10. The system of claim 8, wherein said node in said intelligent network comprises a service control function.

11. The system of claim 8, wherein said notification signal comprises sending initial data to a service.

12. The system of claim 11, wherein said initial data includes a service key.

13. The system of claim 8, wherein said control signal comprises a request from a service to apply pre-paid charging limits to a call.

14. The system of claim 8, wherein said packet data network includes means for sending bit interval information to said intelligent network when a specified amount of data has been transmitted, and said intelligent network includes means for determining a new maximum value of packet data for transmission using said bit interval information.

15. A system for establishing an interface between an intelligent network and a packet data network, said system comprising:
   means for activating a communications session in said packet data network;
   a node in said intelligent network; and
   a node in said packet data network, said note in said packet data network including means for sending a notification signal to said node in said intelligent network, said note in said intelligent network including means for sending a control signal to said node in said packet data network, said control signal including information to limit a duration of said communications session in said packet data network, said node in said packet data network adapted to send a session clear signal to said node in said intelligent network if said communications session terminates before the limit of said duration of said communications session.

* * * * *